E. P. PORCHER.
PUMP.
APPLICATION FILED JUNE 26, 1914.
1,135,320.
Patented Apr. 13, 1915.
2 SHEETS—SHEET 2.
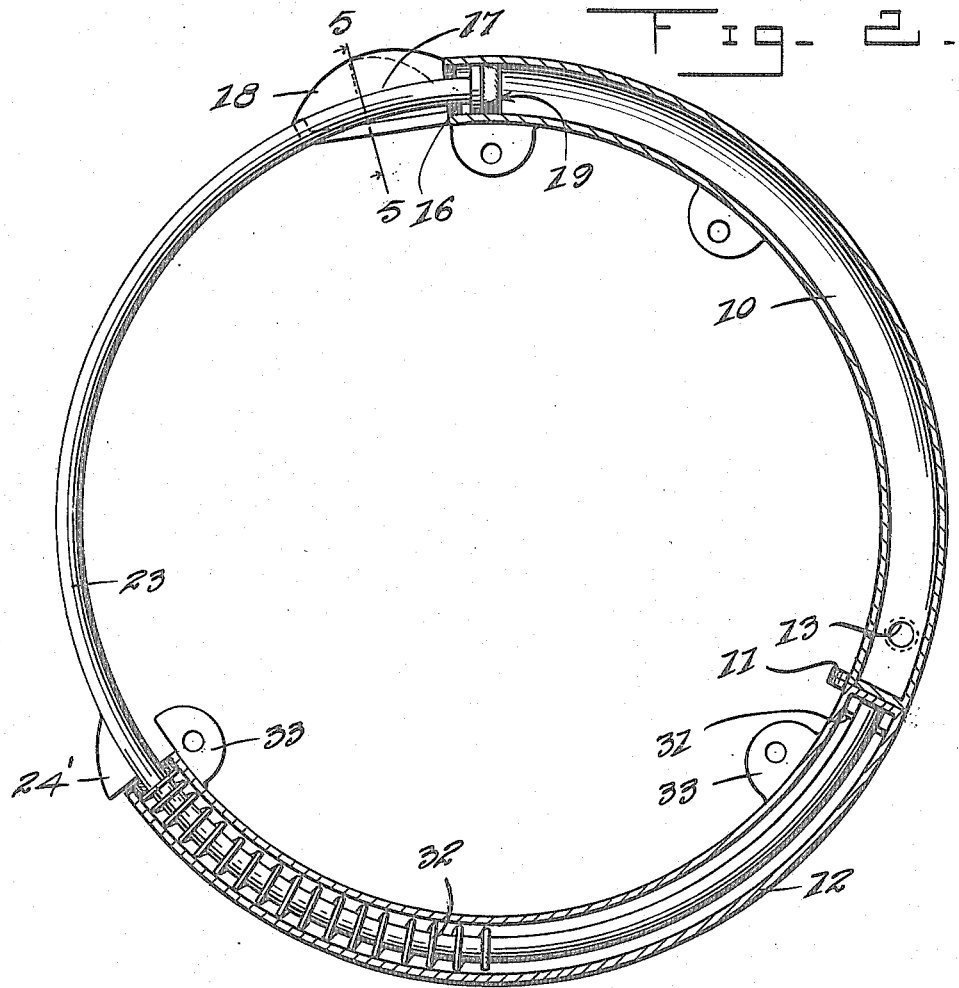
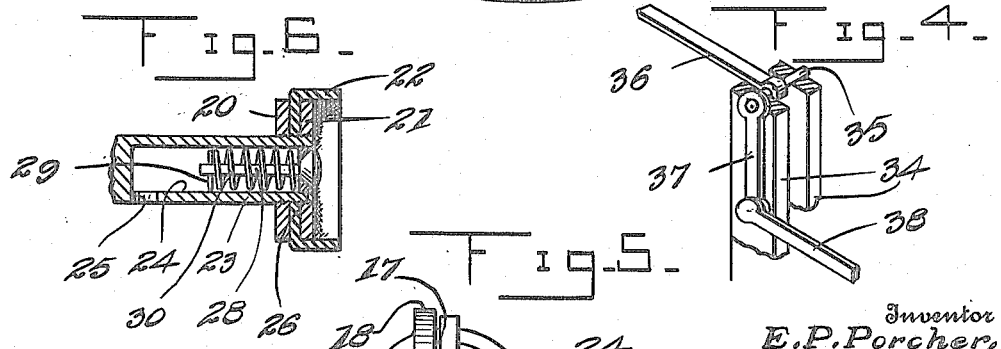
Inventor
E. P. Porcher,
Witnesses

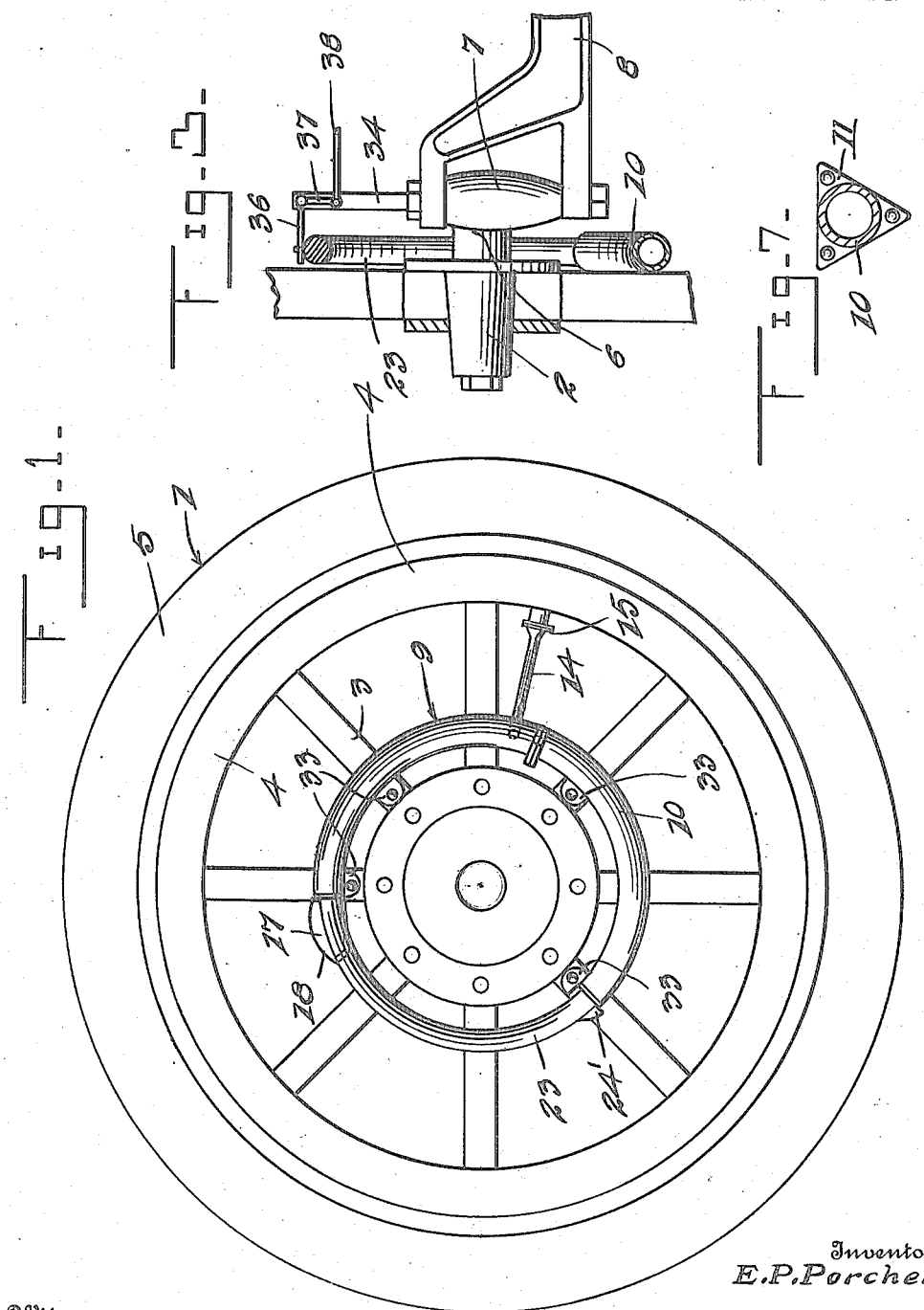

UNITED STATES PATENT OFFICE.

EDWARD P. PORCHER, OF CHARLESTON, SOUTH CAROLINA.

PUMP.

1,135,320.

Specification of Letters Patent.

Patented Apr. 13, 1915.

Application filed June 26, 1914. Serial No. 847,535.

*To all whom it may concern:*

Be it known that I, EDWARD P. PORCHER, a citizen of the United States, residing at Charleston, in the county of Charleston and State of South Carolina, have invented certain new and useful Improvements in Pumps; and I do hereby declare the following to be a full, clear, and exact description of the invention, such as will enable others skilled in the art to which it appertains to make and use the same.

This invention relates to new and useful improvements in pumps, and has for its principal object to provide a pump which will inflate the tires of vehicle wheels while the said vehicles are in motion.

Another object of the invention is to provide a pump which may be secured to the wheels of a vehicle and which may be controlled from the seat of the driver.

A further object of the invention is to provide a pump which operates automatically with the revolution of the wheel of the vehicle upon which it is used.

With these and other objects in view, the invention consists in the novel combination and arrangement of parts which will be fully set forth in the following specification and accompanying drawings, in which, Figure 1 is a side view in elevation of a vehicle wheel showing a pump constructed in accordance with this invention as it would appear when applied thereto, Fig. 2 is a longitudinal sectional view of a pump constructed in accordance with this invention, Fig. 3 is an enlarged detail sectional view of a wheel showing the pump in place, and illustrating the mechanism carried by the steering knuckle to actuate the pump, Fig. 4 is a detail perspective view of the mechanism carried by the steering knuckle, Fig. 5 is a transverse sectional view taken on lines 5—5 of Fig. 2, Fig. 6 is an enlarged detail sectional view of the pump piston illustrating the air inlet valve, and Fig. 7 is a detail view of the flange coupling for the pump cylinder.

Referring now to the drawings by characters of reference, the numeral 1 designates as an entirety a vehicle wheel comprising the usual hub 2, spokes 3, rim 4, and tire 5. This wheel is mounted to rotate on the stub axle 6 which is carried by the knuckle joint 7. This knuckle joint is formed on the axle 8 and is arranged to rotate between the bifurcated ends thereof.

The pump, which is designated generally by the numeral 9, comprises the cylinder 10 having formed at one end the flange 11 by means of which the guide member 12 is secured thereto. This cylinder is provided with the air outlet port 13 which is arranged to communicate with the pipe 14, the free end of which is provided with a suitable coupling 15, by means of which the same is connected to the valve of the vehicle tire. This pump cylinder is provided at the end opposite the flange 11 with the suitable internal screw threads in which the plug 16 is threaded. A suitable extension 17 is formed on the cylinder and is provided with the cam edge 18, the use of which will appear as the description proceeds. Slidable in the cylinder is the plunger designated generally by the numeral 19, which comprises the nuts 20 and 21 between which the washer 22, which is of any suitable flexible material, is clamped. These nuts are threaded on the end of the piston rod 23, which is provided with the internal bore 24 having communicating therewith the transverse bore 25. This internal bore is provided with threads as illustrated in Fig. 6, in which the plug 26, forming a valve seat for the valve 27, is threaded. This valve 27 has formed thereon the stem 28 carrying the pin 29 against which the spring 30 bears to hold the valve normally seated.

The end of the piston rod 23 opposite the plunger is provided with a suitable pin 31 and is slidable in the guide casing 12 hereinbefore referred to. A suitable coil spring 32 is operatively mounted in the guide casing and said spring is arranged to abut the pin 31 to force the plunger in the position illustrated in Fig. 2 when the device is in use. Suitable connection ears 33 are secured to the guide casing 12 and to the pump cylinder 10 and said ears are arranged to form a means whereby the device is connected to the spokes of the wheel upon which it is used. Formed on the piston rod 23 intermediate its ends is the upstanding dog 24' by means of which the rod is actuated.

Extending upwardly from the knuckle joint, hereinbefore referred to, is the member 34, which is bifurcated at its upper end as illustrated in Fig. 4 and is provided with suitable bearings through which the shaft 35 extends. This shaft 35 is arranged to rigidly support the arm 36 and one end of the shaft is extended and carries the arm 37 which projects at substantially right angles to the arm 36 to form a bell crank lever. Secured to the free terminal of the arm 37 is the rod 38, which may be connected in any suitable manner to the rod which controls the operation of the device.

It will be apparent from the foregoing that in use the pump is secured to the vehicle wheel by means of the ears 33, and when the wheel is rotated, it will be apparent that the extension 36 will engage the dog 24', thus causing the plunger 19 to be forced through the cylinder 10, which will force the air within the cylinder through the opening 13 and into the pipe 14, from whence it passes through the coupling 15 into the tire. As soon as the lever 36 reaches the cam face 18 of the extension 17, it will be apparent that the same will ride over the cam face and permit the dog 24' to be released, thus allowing the piston rod 23 to slide back to the position illustrated in Fig. 2 under the influence of the spring 32. When the plunger is returning to its normal position it will be apparent that the valve 27 will be raised from its seat and permit air to enter the pump cylinder, thus placing the pump in condition to again operate. When it is desired to throw the pump out of operation, the lever 38 is pushed which will cause the bell crank lever 37 to swing outwardly and thereby raise the lever 36 from its position on the pump cylinder. In this position it will be apparent that the pump will be thrown out of operation and may be controlled from the seat of the driver of the vehicle upon which the device is used.

While in the foregoing there has been shown and described the preferred embodiment of this invention, it is to be understood that such changes may be made in the combination and arrangement of parts as will fall within the spirit and scope of the invention as defined in the appended claims.

Having thus described my invention, I claim:

1. A pump including a cylinder, a piston slidable in the cylinder, a piston rod operatively connected to the piston, a lateral projection on the piston rod, a lever arranged to engage the piston rod and hold the same against movement while the cylinder is moved in the direction of the piston and a cam carried by the cylinder, said cam being arranged to engage the lever and raise the same clear of the lateral projection on the piston rod to permit said rod to return to its normal position.

2. A pump including an arcuate cylinder arranged to be secured to the spoke of a motor vehicle wheel, a piston slidable in the cylinder, an arcuate piston rod connected to the piston, inlet and outlet valves communicating with the cylinder, a lug on the piston rod, a pivoted lever carried by the vehicle on which the device is used, said lever being arranged to engage the lug on the piston rod to hold the rod against movement and allow the cylinder to slide on the piston and means carried by the cylinder to raise the lever clear of the lug on the piston rod to permit the piston to return to its normal position.

3. The combination with a motor vehicle having a plurality of wheels, of a pump cylinder, secured to one of the wheels, said pump cylinder being arcuate, a pump piston slidable in the cylinder, a plunger rod connected to the pump piston, said plunger rod being arcuate and substantially twice the length of the length of the piston, a guide connected to the cylinder, a spring within the guide and arranged to normally throw the pump piston into operative position, a lug carried by the piston rod, means carried by the knuckle joint of the vehicle to engage the lug to hold the piston rod against movement while the piston revolves, thus compressing the air within the cylinder, and means carried by the cylinder to release the piston to permit the spring to throw the same to its normal position.

4. The combination with a motor vehicle provided with a plurality of wheels, of a pump cylinder secured to each of the wheels, said pump cylinder being arcuate and surrounding the hub of the wheel, a pump piston operative within the cylinder, a plunger rod secured to the piston, said plunger rod being arcuate to conform to the shape of the cylinder, a lug carried by the plunger rod, means carried by the vehicle axles to engage the lug, means operatively connected therewith to throw the same out of engagement, and a cam carried by the pump cylinder to throw the lever free of the dog on the plunger rod to permit the same to return to its normal position.

5. A pump including an arcuate cylinder arranged to be secured to the wheel of a motor vehicle, a flexible tube connecting the pump cylinder with the tire of the vehicle, a piston slidable in the cylinder, an arcuate piston rod connected to the piston and arranged to operate the same within the cylinder, a lug carried by the piston rod near the end opposite the piston, a spring to normally force the piston rod outwardly, a lever secured to the frame of the motor vehicle upon which the device is used, said lever being arranged to engage the lug to hold the piston rod against movement, means carried by the cylinder to raise the lever clear of the lug to permit the piston to return to its normal position and means connected to the lever to manually control the same to throw the pump into or out of operation at the desire of the user.

6. A pump including an arcuate cylinder arranged to be secured to the wheel of a motor vehicle, a piston slidable in the cylinder, an arcuate piston rod connected to the piston and arranged to actuate the same, a lug carried by the arcuate piston rod near the end opposite the piston, spring means to normally hold the end of the piston rod outwardly away from the piston, the lug being provided with a flat face on its forward side and a cam face on its rear side, a lever arranged to engage the flat face of the lug to hold the pump against movement and permit the cylinder to rotate therein, means carried by the pump section to raise the lever clear of the lug after the pump section has completed its channel, the rear side of the lug being so constructed as to show the lever clear of itself to prevent the piston from becoming broken, and means connected to the lever to manually control the operation of the same.

In testimony whereof I affix my signature in presence of two witnesses.

EDWARD P. PORCHER.

Witnesses:
H. KAYE MARTIN,
W. C. DAVIS.